(12) United States Patent
Kim

(10) Patent No.: US 8,059,231 B2
(45) Date of Patent: Nov. 15, 2011

(54) BACKLIGHT UNIT FOR DECREASING A THICKNESS AND DISPLAY APPARATUS HAVING THE SAME

(75) Inventor: Jae Hong Kim, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 298 days.

(21) Appl. No.: 12/438,104

(22) PCT Filed: Aug. 16, 2007

(86) PCT No.: PCT/KR2007/003910
§ 371 (c)(1),
(2), (4) Date: Feb. 19, 2009

(87) PCT Pub. No.: WO2008/023900
PCT Pub. Date: Feb. 28, 2008

(65) Prior Publication Data
US 2010/0238380 A1    Sep. 23, 2010

(30) Foreign Application Priority Data
Aug. 25, 2006    (KR) .................. 10-2006-0081305

(51) Int. Cl.
*G02F 1/1335*    (2006.01)
(52) U.S. Cl. .......................... 349/67; 362/606
(58) Field of Classification Search ............. 349/65–69, 349/56, 58, 59, 61, 62, 70, 113; 362/606, 362/609, 632–634, 97.2
See application file for complete search history.

(56) References Cited

U.S. PATENT DOCUMENTS

| | | | |
|---|---|---|---|
| 6,848,800 B2* | 2/2005 | Kim | 362/26 |
| 7,021,813 B2* | 4/2006 | Lee et al. | 362/609 |
| 7,139,046 B2* | 11/2006 | Katahira | 349/58 |
| 7,239,792 B2* | 7/2007 | Kim | 385/125 |
| 7,261,457 B2* | 8/2007 | Inoue | 362/609 |
| 2003/0043314 A1* | 3/2003 | Lee et al. | 349/65 |
| 2003/0117562 A1* | 6/2003 | Kim | 349/149 |
| 2004/0008524 A1* | 1/2004 | Lee et al. | 362/561 |

FOREIGN PATENT DOCUMENTS

| | | |
|---|---|---|
| CN | 1677185 A | 10/2005 |
| CN | 1821852 A | 8/2006 |
| JP | 2005-115335 | 5/2005 |
| JP | 2006-119600 | 5/2006 |
| KR | 10-2006-0088923 | 8/2006 |

\* cited by examiner

*Primary Examiner* — Akm Ullah
(74) *Attorney, Agent, or Firm* — Birch, Stewart, Kolasch & Birch, LLP

(57) ABSTRACT

Disclosed are a backlight unit and a display apparatus having the same. The backlight unit comprises a light guide plate receiving light and outputting the light, a light emitting unit comprised at an one end portion of the light guide plate, a fixing frame comprising an opened interior, in which the light emitting unit and the light guide plate are comprised in the opened interior, and a reflection frame comprised at an outer side of the fixing frame and reflecting leaked light.

14 Claims, 2 Drawing Sheets

[Fig. 1]
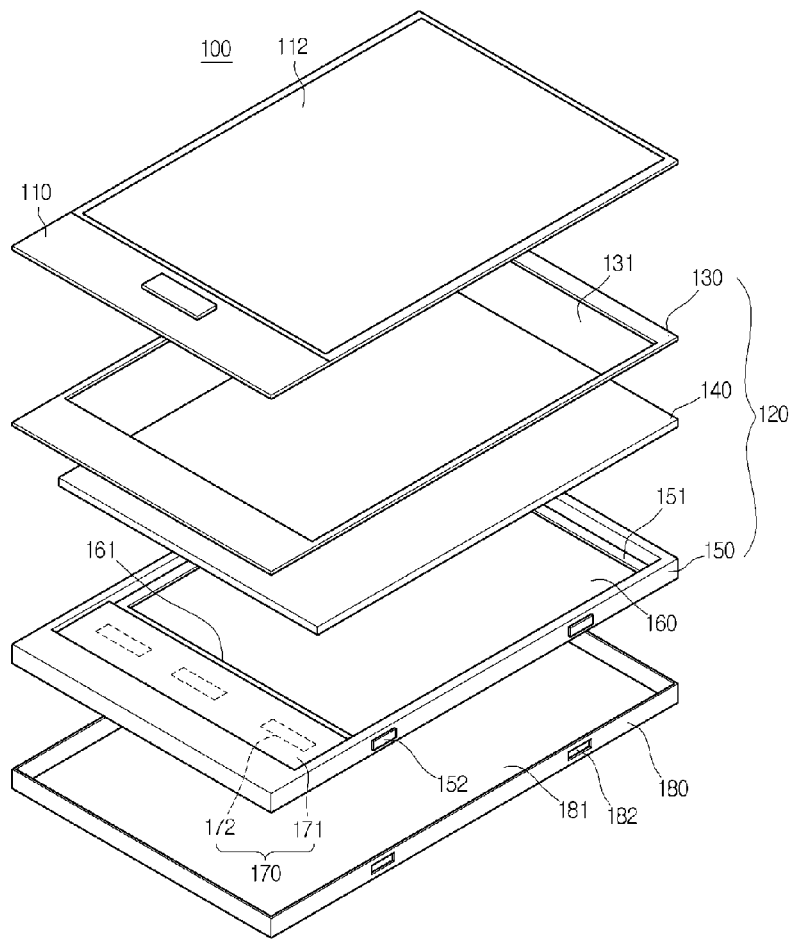
[Fig. 2]
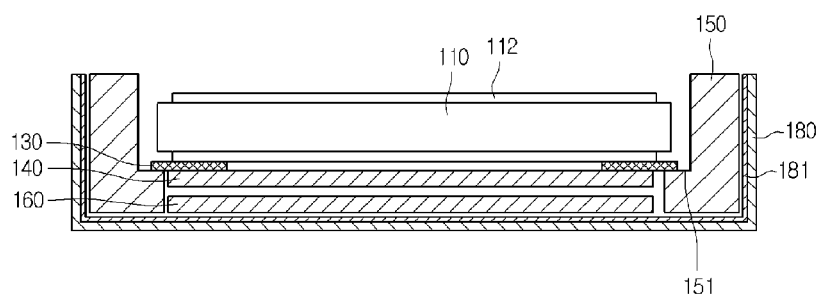
[Fig. 3]
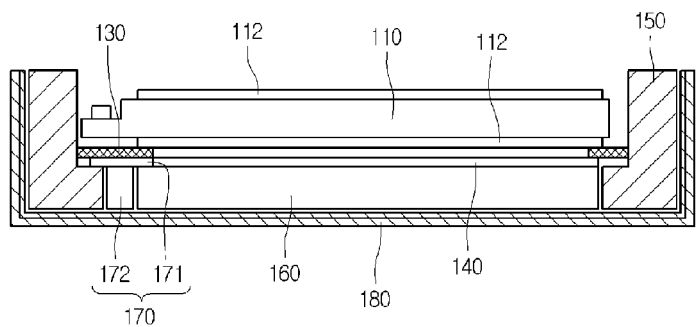

[Fig. 4]
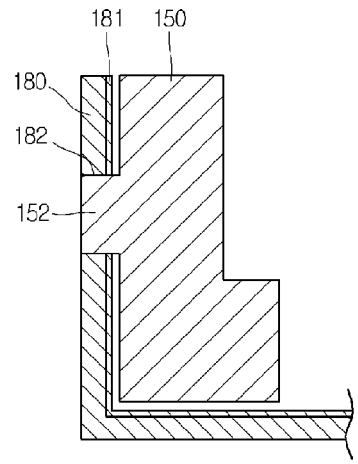
[Fig. 5]
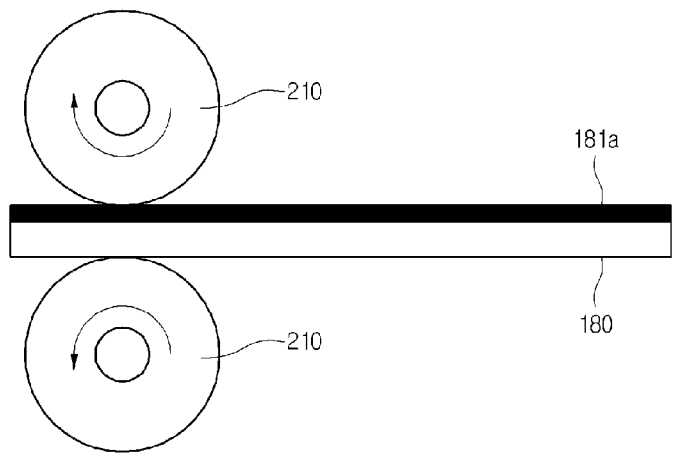
[Fig. 6]
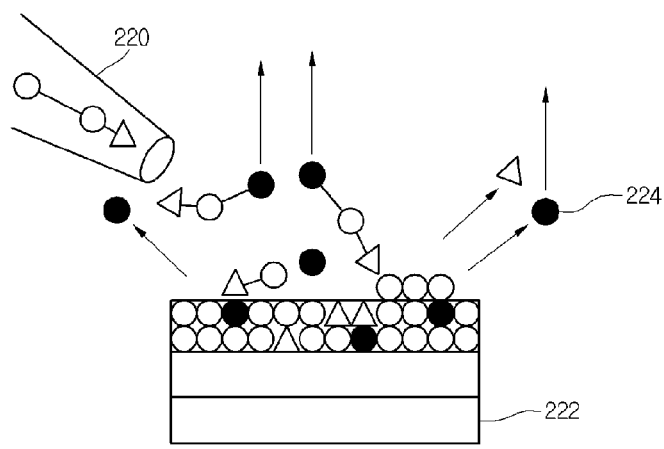

BACKLIGHT UNIT FOR DECREASING A THICKNESS AND DISPLAY APPARATUS HAVING THE SAME

CROSS-REFERENCE TO RELATED APPLICATION

This application is the U.S. national stage application of International Patent Application No. PCT/KR2007/003910, filed Aug. 16, 2007, the disclosure of which is hereby incorporated by reference in its entirety.

TECHNICAL FIELD

Embodiments relate to a backlight unit and display apparatus having the same.

BACKGROUND ART

Display apparatuses include Cathode Ray Tube (CRT), a Liquid Crystal Display (LCD) using an electro-optic effect, a Plasma Display Panel (PDP) using gas-discharge and an Electro Luminescence Display (ELD) using electro-luminescence effect. Among the display apparatuses, research into the LCD has been actively conducted.

Since the LCD is advantageous in terms of miniaturization, weight, low power consumption, full color implementation and the like, the LCD can overcome the disadvantages of a CRT and has been widely used for various fields.

Since such an LCD is a light receiving device that displays an image by controlling the amount of light from the outside, the LCD requires an additional external light source such as a backlight unit.

DISCLOSURE OF INVENTION

Technical Problem

An embodiment provides a backlight unit without a reflection sheet and a display apparatus having the same.

An embodiment provides a backlight unit capable of reflecting leakage light by using a reflection frame having a reflection surface at an outer side of a fixing frame, in which a liquid crystal panel and a light guide plate are coupled, and a display apparatus having the same.

Technical Solution

An embodiment, a backlight unit comprises a light guide plate receiving light and outputting the light; a light emitting unit comprised at an one end portion of the light guide plate; a fixing frame comprising an opened interior, in which the light emitting unit and the light guide plate are comprised in the opened interior; and a reflection frame comprised at an outer side of the fixing frame and reflecting leaked light.

An embodiment, a display apparatus comprises a light guide plate receiving light and outputting the light in a form of surface light; a light emitting unit comprised at an one end portion of the light guide plate; a fixing frame comprising an opened interior, in which the light emitting unit and the light guide plate are comprised in the opened interior; a reflection frame comprised at an outer side of the fixing frame and reflecting leaked light; and a liquid crystal panel comprised on the light guide plate.

ADVANTAGEOUS EFFECTS

According to a backlight unit and a display apparatus having the same based on an embodiment, the reflection sheet of a backlight unit is removed, so that an assembly tolerance between a fixing frame and a reflection frame can be reduced and thus the thickness of the display apparatus can be decreased.

Further, a process of coupling the reflection sheet is omitted, so that the process steps of the display apparatus can be decreased.

BRIEF DESCRIPTION OF THE DRAWINGS

FIG. 1 is an exploded perspective view showing an LCD according to an embodiment;

FIG. 2 is a side sectional view showing the coupling state of the LCD shown in FIG. 1, which is taken along a short axis direction;

FIG. 3 is a side sectional view showing the coupling state of the LCD shown in FIG. 1, which is taken along a long axis direction;

FIG. 4 is a sectional view showing an example in which the fixing frame is coupled to the reflection frame in FIG. 1;

FIG. 5 is a view showing a first example in which a reflection surface is formed on a reflection frame according to an embodiment; and FIG. 6 is a view showing a second example in which a reflection surface is formed on a reflection frame according to an embodiment.

BEST MODE FOR CARRYING OUT THE INVENTION

Hereinafter, an LCD according to an embodiment will be described with reference to accompanying drawings.

FIG. 1 is an exploded perspective view showing an LCD according to an embodiment, FIG. 2 is a side sectional view showing the coupling state of the LCD shown in FIG. 1, which is taken along a short axis direction, and FIG. 3 is a side sectional view showing the coupling state of the LCD shown in FIG. 1, which is taken along a long axis direction.

Referring to FIGS. 1 to 3, an LCD 100 comprises a liquid crystal panel 110 and a backlight unit 120.

The liquid crystal panel 110 comprises a liquid crystal layer (not shown) interposed between an upper substrate (not shown) and a lower substrate (not shown). For example, the upper substrate can be prepared in the form of a color filter array substrate and the lower substrate can be prepared in the form of a TFT array substrate. Further, the upper substrate can be prepared in the form of a TFT array substrate and the lower substrate can be prepared in the form of a color filter array substrate. Furthermore, the upper or lower substrate can be prepared in the form of a Color filter On Array (COA) structure in which a color filter is integrally formed with a TFT array. In the liquid crystal layer, cells are formed such that the longitudinal axis of liquid crystal molecules has an angle of 90° relative to two transparent electrodes aligned to be parallel with an electrode plane. In such a state, a nematic liquid crystal is injected into the cell, so the longitudinal axis of the liquid crystal is continuously twisted with an angle of 90° from one electrode toward the other electrode. In the embodiment, the liquid crystal in the TN (twist nematic) mode is described as an example. However, a liquid crystal panel having an ECB, an OCB, an IPS, or a VA mode can be realized, and the liquid crystal can also operate in a normally black or white mode according to display schemes.

A polarizing plate 112 can be attached to at least one surface of the both surfaces of the liquid crystal panel 110, and transmission axes of the polarizing plate 112 attached to the both surfaces of the liquid crystal panel 110 are perpendicular to each other.

The backlight unit 120 comprises an outer light blocking member 130, an optical sheet member 140, a fixing frame 150, a light guide plate 160, a light emitting unit 170 and a reflection frame 180.

An outer light blocking member 130 is formed in an area other than a light emitting region 131, and is attached between the fixing frame 150 and the liquid crystal panel 110 to prevent light from being leaked to the outer side of the liquid crystal panel 110. Such an outer light blocking member 130, for example, can be prepared in the form of a double coated tape.

The optical sheet member 140 can include at least one diffusion sheet (not shown) or at least one prism sheet (not shown). The diffusion sheet improves light uniformity of the light emitting region, and the prism sheet includes horizontal and vertical prism sheets and concentrates light to the light emitting region. A protection sheet that protects a prism mountain may also be provided on the prism sheet.

The fixing frame 150 can be prepared in the form of a mold member including plastic having an opened interior, and the light guide plate 160 and the light emitting unit 170 are coupled in the opened interior. A locking protrusion 151 is formed around the inner periphery of the fixing frame 150, and the light guide plate 160 and the light emitting unit 170 are easily coupled to the fixing frame 150 through the locking protrusion 151. A protrusion 152 is formed on the outer surface of the fixing frame 150.

The light guide plate 160 includes reflection patterns (not shown) having pre-determined intervals at the bottom surface thereof, and guides and reflects light incident from a light receiving section 161 to emit the light in the form of surface light. The optical sheet member 140 is aligned on the light guide plate 160 of the fixing frame 150.

The light emitting unit 170 generates light at one end of the light guide plate 160 and outputs the light to the light guide plate 160. Such a light emitting unit 170 can be prepared using a plurality of Light Emitting Diodes (LEDs) 172 mounted on a Printed Circuit Board (PCB) 171. Further, the light emitting unit 170 can be prepared using a bar shaped emitting lamp, e.g. CCFL, or a combination of a bar shaped emitting lamp and an LED.

As shown in FIGS. 2 and 3, the reflection frame 180 is coupled to the outer side of the fixing frame 150. The reflection frame 180 covers the lower and side portions of the fixing frame 150, and the upper surface of the reflection frame 180 serves as a reflection surface 181. Such a reflection frame 180 may include stainless material having the reflection surface 181 formed through coating or deposition of reflection material on the upper surface of the reflection frame 180. The reflection surface 181 of the reflection frame 180 corresponds to the outer side of the fixing frame 150 and reflects light, which is leaked to the lower portion of the light guide plate 160, in the liquid crystal panel direction again. The reflection surface 181 has a thickness of 0.01 mm or less.

The light guide plate 160 and the light emitting unit 170 are coupled in the fixing frame 150, the optical sheet member 140 is aligned on the light guide plate 160, and the outer light blocking member 130 is attached to the outer side of the optical sheet member 140. At this time, the reflection frame 180 is coupled with the fixing frame 150 while making contact with the outer side of the fixing frame 150. The reflection frame 180 can be coupled before or after the coupling of the liquid crystal panel 110. In the backlight unit 120, the reflection frame 180 performs a reflection function and serves as a bottom chassis.

FIG. 4 is a sectional view showing an example, in which the fixing frame is coupled to the reflection frame, according to the embodiment.

Referring to FIGS. 1 and 4, the protrusion 152 is formed on the side surface of the fixing frame 150 and a protrusion hole 182 is formed in the side surface of the reflection frame 180. As the fixing frame 150 is inserted into the reflection frame 180, the protrusion 152 of the fixing frame 150 is coupled with the protrusion hole 182 of the reflection frame 180. Accordingly, the fixing frame 150 can fixedly adhere closely to the reflection frame 180. The coupling scheme of the fixing frame 150 and the reflection frame 180 is not limited to the coupling structure or coupling scheme using the protrusion 152 and the protrusion hole 182.

The reflection frame 180 is coupled to the fixing frame 150 while closely adhering to the outer side of the fixing frame 150, so that light leaked through the lower portion of the light guide plate may be reflected from the reflection surface 181. In addition, the assembly tolerance between the reflection frame 180 and the fixing frame 150 can be minimized, so the thickness of the LCD 100 can be reduced.

Further, the reflection frame 180 is coupled to the fixing frame 150 while making contact with the outer surface of the fixing frame 150, so that the entire assembly process can be simplified by omitting a process of attaching the reflection sheet.

FIG. 5 is a view showing an first example in which the reflection surface is formed on the reflection frame according to the embodiment.

Referring to FIG. 5, a reflection sheet is attached to the disk of the reflection frame 180 to a laminating coating method by using one pair of rollers 120, thereby forming a reflection surface 181a at one side of the disk. The reflection surface 181a has a thickness of 0.01 mm or less. The disk of the reflection frame 180 is bent to have a desired shape through a press process, and then coupled with the fixing frame 150 while closely adhering to the fixing frame 150.

FIG. 6 is a view showing a second example in which the reflection surface is formed on the reflection frame according to the embodiment.

Referring to FIG. 6, the reflection surface 181b is formed on the reflection frame 180 through an ion beam deposition process. According to the ion beam deposition process, as source gas is injected into a chamber through a gas injection hole 220, electrons 224 ionized from a material target 222 are emitted and then deposited on an one side of the reflection frame 180, thereby forming the reflection surface 181b on the bottom surface of the reflection frame 180. The reflection surface 181b includes material (e.g. Al, Ag) having a high light reflectivity, and such material is deposited with a thickness of 0.01 mm or less.

In the embodiment, the backlight unit includes the reflection frame. However, the reflection frame may also be coupled as an additional element according to the specifications of the backlight unit. The LCD can be applied as the display module of a cell phone or a monitor.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

According to the backlight unit and the display apparatus having the same of an embodiment, the reflection sheet of the backlight unit is removed, so that the assembly tolerance between the fixing frame and the reflection frame can be minimized, so the thickness of the display apparatus can be reduced.

Further, a process of coupling the reflection sheet is omitted, so that the process steps of the display apparatus can be decreased.

The embodiment provides the LCD having a thickness thinner than that of the related LCD, so that the LCD can be applied to a cell phone having a tendency of slimness.

The invention claimed is:

1. A backlight unit for decreasing a thickness comprising:
a light guide plate receiving light and outputting the light;
a light emitting unit comprised at an one end portion of the light guide plate;
a fixing frame comprising an opened interior, in which the light emitting unit and the light guide plate are comprised in the opened interior; and
a reflection frame comprised at an outer side of the fixing frame and reflecting leaked light,
wherein the reflection frame includes a bottom part under the fixing frame, and four side walls extended from the bottom part and disposed at a side of the fixing frame, and
wherein the reflection frame comprises a reflection surface disposed on the bottom part and between the side walls and the fixing frame.

2. The backlight unit as claimed in claim 1, wherein the bottom part and the side walls use stainless material.

3. The backlight unit as claimed in claim 1, wherein the reflection frame closely adheres to the outer side of the fixing frame, and the reflection surface reflects light leaked through a lower portion of the light guide plate.

4. The backlight unit as claimed in claim 1, wherein the reflection frame closely adheres to the outer side of the fixing frame, and the reflection surface is formed by a reflection sheet is coated or reflection material is deposited.

5. The backlight unit as claimed in claim 4, wherein the reflection surface has a thickness of 0.01 mm or less.

6. The backlight unit as claimed in claim 1, wherein the fixing frame and the reflection frame are formed with a protrusion and a protrusion hole, respectively, so that the fixing frame is coupled with the reflection frame.

7. The backlight unit as claimed in claim 1, wherein the light emitting unit comprises at least one of a Light Emitting Diode (LED) and a bar-shaped emitting lamp.

8. A display apparatus for decreasing a thickness, comprising:
a light guide plate receiving light and outputting the light in a form of surface light;
a light emitting unit comprised at an one end portion of the light guide plate;
a fixing frame comprising an opened interior, in which the light emitting unit and the light guide plate are comprised in the opened interior;
a reflection frame comprised at an outer side of the fixing frame and reflecting leaked light; and
a liquid crystal panel on the light guide plate,
wherein the reflection frame includes a bottom part under the fixing frame and four side walls extended from the bottom part and disposed at a side of the fixing frame, and
wherein the reflection frame comprises a reflection surface disposed on the bottom part and between the side walls and the fixing frame.

9. The display apparatus as claimed in claim 8, wherein the bottom part and the side walls use stainless material.

10. The display apparatus as claimed in claim 8, wherein the reflection frame closely adheres to the outer side of the fixing frame, and the reflection surface reflects light, which is leaked through a lower portion of the light guide plate, to the liquid crystal panel.

11. The display apparatus as claimed in claim 8, wherein the reflection frame closely adheres to the outer side of the fixing frame, and the reflection surface comprises a reflection sheet is coated or material having a high reflectance is deposited.

12. The display apparatus as claimed in claim 11, wherein the reflection surface has a thickness of 0.01 mm or less.

13. The display apparatus as claimed in claim 8, comprising a diffusion sheet and a prism sheet on the light guide plate.

14. The display apparatus as claimed in claim 8, wherein the fixing frame and the reflection frame are formed with a protrusion and a protrusion hole, respectively, so that the fixing frame is coupled with the reflection frame.

* * * * *